(12) United States Patent
Tripp et al.

(10) Patent No.: US 6,716,389 B2
(45) Date of Patent: Apr. 6, 2004

(54) TANTALUM AND TANTALUM NITRIDE POWDER MIXTURES FOR ELECTROLYTIC CAPACITORS SUBSTRATES

(75) Inventors: Terrance B. Tripp, Westborough, MA (US); Barbara L. Cox, West Roxbury, MA (US)

(73) Assignee: H. C. Starck Inc, Newton, MA (US)

( * ) Notice: Subject to any disclaimer, the term of this patent is extended or adjusted under 35 U.S.C. 154(b) by 0 days.

(21) Appl. No.: 10/280,295

(22) Filed: Oct. 25, 2002

(65) Prior Publication Data

US 2003/0126944 A1 Jul. 10, 2003

Related U.S. Application Data

(62) Division of application No. 09/695,512, filed on Oct. 24, 2000, now Pat. No. 6,554,884.

(51) Int. Cl.⁷ .................................................. B22F 3/00
(52) U.S. Cl. ............................. 419/13; 419/26; 419/48; 75/252; 361/509; 361/529
(58) Field of Search ............................. 419/13, 26, 48; 75/252; 361/509, 529

(56) References Cited

U.S. PATENT DOCUMENTS

| | | | | |
|---|---|---|---|---|
| 3,825,802 A | * | 7/1974 | Kumagai et al. ............ 361/529 |
| 4,154,609 A | | 5/1979 | Hähn ......................... 75/252 |
| 4,544,403 A | | 10/1985 | Schiele et al. ............ 75/0.5 AB |
| 5,448,447 A | | 9/1995 | Chang ........................ 361/529 |
| 5,825,611 A | | 10/1998 | Pozdeev ...................... 361/524 |
| 6,051,044 A | | 4/2000 | Fife | |
| 6,115,235 A | | 9/2000 | Naito .......................... 361/303 |
| 6,377,443 B1 | | 4/2002 | Hahn et al. ................. 361/508 |
| 6,410,083 B1 | | 6/2002 | Pozdeev-Freeman ........ 427/216 |
| 6,423,110 B1 | | 7/2002 | Naito et al. ................. 75/232 |
| 6,432,161 B1 | | 8/2002 | Oda et al. .................... 75/363 |
| 2002/0088507 A1 | | 7/2002 | Rao et al. ................... 148/422 |
| 2002/0101645 A1 | | 8/2002 | Pozdeev-Freeman ........ 359/291 |

FOREIGN PATENT DOCUMENTS

| | | |
|---|---|---|
| JP | 53-49254 | 5/1978 |
| WO | 00/49633 | 8/2000 |
| WO | 02/34436 | 5/2002 |

* cited by examiner

*Primary Examiner*—Ngoclan Mai
(74) *Attorney, Agent, or Firm*—Godfried R. Akorli; Diderico van Eyl

(57) ABSTRACT

A process for producing sintered pellets made from blends of refractory metal and refractory metal nitride powders were found to have a higher fraction of intra-agglomerate pores than those made from the refractory metal or refractory metal nitride alone resulting in improved capacitor grade powders, anodes and finished capacitors therefrom. The pellet porosity and total intrusion volume maximizes when the mixture is in the 50–75 W/W % refractory metal nitride range. The total pellet pore surface area was found to be relatively independent of refractory metal nitride concentration above 50%. A substrate consisting of a 50/50 or 25/75 W/W % refractory metal/refractory metal nitride powder mixture should produce solid capacitors with higher capacitance recovery and lower ESR.

10 Claims, 15 Drawing Sheets

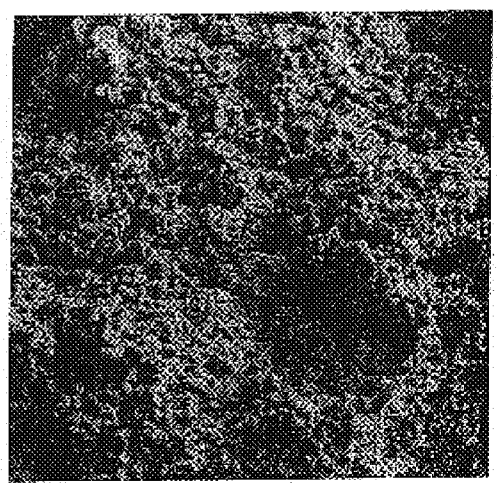 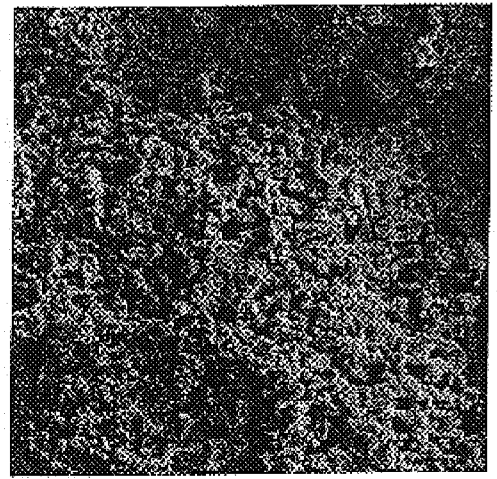
FIG. 10a                    FIG. 10b

TANTALUM AND TANTALUM NITRIDE POWDER MIXTURES FOR ELECTROLYTIC CAPACITORS SUBSTRATES

This application is a Divisional of U.S. Ser. No. 09/695,512, filed Oct. 24, 2000 U.S. Pat. No. 6,554,884.

FIELD OF THE INVENTION

The present invention relates to mixtures of refractory metal powders usable as substrates for thin film dielectric layers formed as anodic films on the substrate material and more particularly to mixtures of tantalum and tantalum nitride powders or niobium and niobium nitride powders usable as substrate material to form high grade wet or solid electrolytic capacitors.

BACKGROUND OF THE INVENTION

The use of nitrogen to improve the performance of solid electrolyte capacitors made using tantalum or niobium as the substrate material is known. U.S. Pat. No. 5,948,447, granted Sep. 5, 1995 to H. Chang/Cabot Corp., describes nitrogen doping of tantalum or niobium powder substrates to reduce leakage and speculating a beneficial effect in limiting crystal growth during anodization. The patent further describes the benefit of higher solubility of nitrogen in tantalum or niobium compared to oxygen to lower leakage by limiting movement of oxygen and a synergistic effect of controlled combinations of nitrogen and oxygen content of the tantalum or niobium substrate. T. Tripp et al/H.C. Starck, Inc. in a symposium paper have described a 30 year long effort to investigate the effects of nitrogen doping on tantalum substrates, mostly as to sputter deposited layers of tantalum or tantalum nitride but including also nitrogen doped powder and describe current work that verifies the effect of nitrogen in retarding migration of oxygen across the metal (Ta or Nb)-anodic oxide interface. In addition, capacitor manufactures believe that a large fraction of intra-agglomerate pores are necessary for making capacitors from high capacitance-voltage (CV) powders. Also, an open porosity will help to reduce the capacitor equivalent series resistance (ESR).

It is therefore an object of the present invention to provide an improved powder mixture suitable as a substrate material in high grade wet or solid electrolytic capacitors.

It is a further object of the present invention to provide a substrate that has a larger fraction of intra-agglomerate pores than the refractory metal or metal-nitride powder alone.

It is a further object of the present invention to provide a method of producing high grade electrolytic capacitors from refractory metal and metal-nitride powder mixtures.

It is a further object of the present invention to provide a thermodynamically stable substrate-anodic film interface making the system less susceptible to the degradation that occurs in the tantalum-tantalum oxide system during thermal cycling.

SUMMARY OF THE INVENTION

The objects set forth above as well as further and other objects and advantages of the present invention are achieved by the embodiments of the invention described hereinbelow.

The present invention provides an improved powder suitable as a substrate material in high grade electrolytic capacitors and method of making same. Sintered pellets made from blends of tantalum and tantalum nitride powders were found to have a higher fraction of intra-agglomerate pores than those made from tantalum or tantalum nitride alone. Pellet porosity and total intrusion volume maximizes when the Ta/TaN mixture is in the 50–75 W/W % TaN range. The total pellet pore surface area was found to be relatively independent of TaN concentration above 50% TaN. A substrate consisting of a 50/50 or 25/75 W/W % Ta/TaN mixture should produce solid capacitors with higher capacitance recovery and lower ESR. Similar results were also found for mixtures of niobium and niobium nitride powders.

The present invention uses a tantalum or niobium powder derived in various known ways and processed to have an extremely low oxygen impurity content, then introducing nitrogen in a reactor schedule that precludes re-oxidation of the refractory metal. The schedule having multiple stages of thermal processing and environmental control defined below to establish a tantalum nitride or niobium nitride powder compound without excess of nitrogen remaining and eventually cooling under inert atmosphere and air release of the powder to form only a limited oxide at room temperature.

Other objects, features and advantages of the invention will be apparent from the following description of preferred embodiments thereof, including illustrative non-limiting examples, of the practice of the process and the resulting products' configuration, composition and performance under test conditions.

BRIEF DESCRIPTION OF THE DRAWINGS

FIG. 10a is a scanning electron photomicrograph showing the pore structure for a 100% Ta pellet composition sintered at a temperature of 1550° C.;

FIG. 10b is a scanning electron photomicrograph showing the pore structure for a 75/25% Ta/TaN pellet composition sintered at a temperature of 1650° C.;

DETAILED DESCRIPTION OF THE PREFERRED EMBODIMENT

Figure 1:
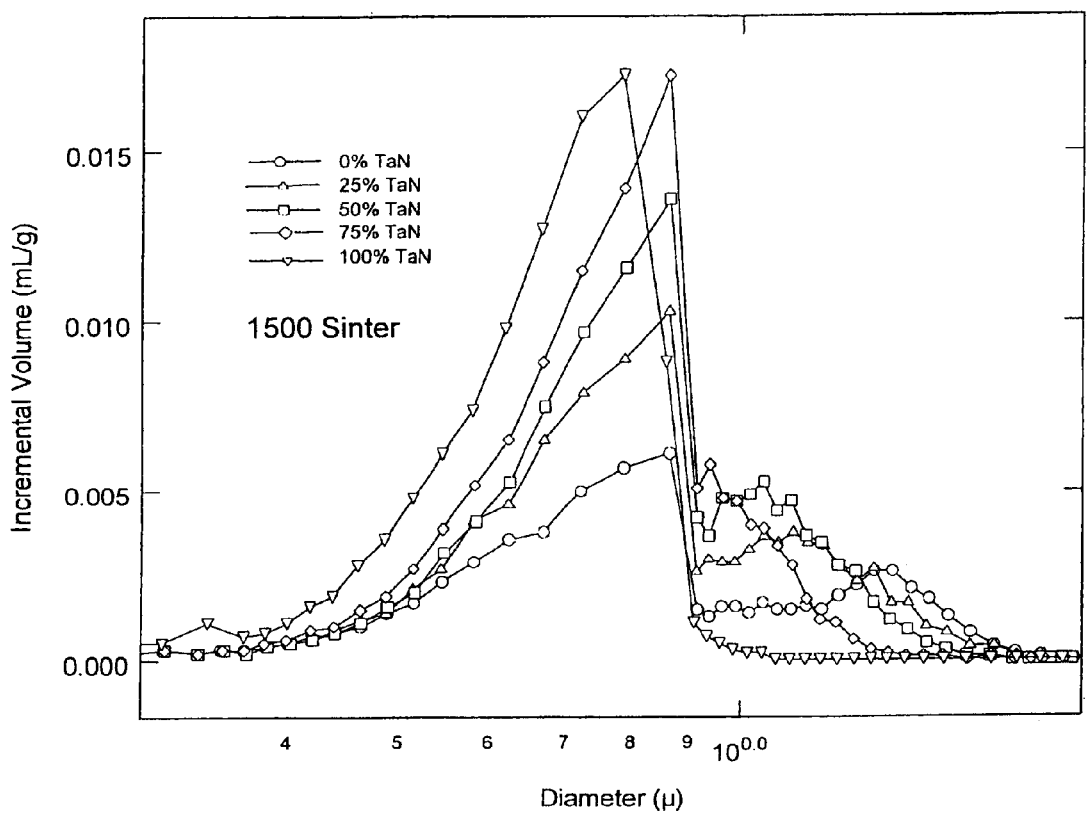
FIG. 1 is a graph of the sintered pellet pore size distribution for pellets vs. the incremental volume for pellets sintered at a temperature of 1500° C.

The tantalum powder was produced by conventional sodium reduction of a potassium fluotantalate precursor and powder leaching and sizing. The powder was presintered at 1320° for 30 minutes and deoxidized using magnesium to remove the excess oxygen introduced during agglomeration. During the deoxidizing process, approximately one kg of the powder was blended with 0.75 W/W % Mg and placed in a laboratory tube furnace in a tantalum lined stainless steel tray. The furnace tube was evacuated, back-filled with argon and heated to 1000° C. This temperature was maintained for two hours and the furnace was allowed to cool overnight.

The resulting powder's properties are summarized in Table I.

TABLE I

| Property | Value |
|---|---|
| Fisher Avg. Part. Dia., FAPD ($\mu$) | 2.0 |
| Flow (gm/sec) | 0.34 |
| Surface Area (cm$^2$/g) | 13,700 |
| Scott Bulk Dens., SBD (gm/in$^3$) | 25.5 |
| Carbon (ppm) | 34 |
| Calcium (ppm) | 2 |
| Chromium (ppm) | 9 |
| Copper (ppm) | 1 |
| Iron (ppm) | 5 |
| Potassium (ppm) | 13 |
| Nitrogen (ppm) | 1,840 |
| Sodium (ppm) | 1 |
| Nickel (ppm) | 11 |
| Oxygen (ppm) | 4,130 |
| Sulfur (ppm) | 10 |
| Silicon (ppm) | 8 |

The tantalum nitride (TaN) powder was produced according to the same process as the tantalum powder described above with the following additional steps. After the furnace cooled overnight, the powder was further processed by increasing the furnace temperature to 680° C. as measured with a thermocouple inside the tube and suspended over the powder. The pressure in the furnace tube was reduced to 610 mm Hg and the system back-filled with nitrogen until the pressure returned to atmospheric (760 mm Hg). Additional nitrogen was added to maintain an approximate atmospheric pressure as the nitrogen was consumed by reaction with the tantalum. Twenty minutes into the process, the pressure was reduced to 460 mm Hg and then increased to 760 mm Hg with nitrogen. At this point, the temperature was 710° C. Again, the pressure was maintained at near atmospheric with nitrogen additions as the temperature was increased over the next 25 minutes to 850° C. The pressure was reduced to 250 mm Hg and increased back to 760 mm Hg with nitrogen. While maintaining near atmospheric pressure in the tube using nitrogen additions, the temperature was increased to 1030° C. over a period of 50 minutes. The pressure was then reduced to ~0 mm Hg and the system filled with nitrogen to 810 mm Hg. The system was maintained at this temperature and pressure for five hours.

The furnace was allowed to cool to room temperature and the powder was passivated using a high capacitance powder passivation cycle. The powder was leached with dilute $H_2SO_4$ solution to remove the MgO, $Mg_2N_3$ and any residual Mg. The residues of acid were removed by rinsing with high purity water. The powder was dried at 60° C. The powder was analyzed for nitrogen and confirmed to be the compound TaN.

The niobium powder was produced by magnesium reduction of a niobium pentoxide precursor. One kilogram of the powder was blended with 22 grams of magnesium and placed in a niobium foil lined stainless steel tray. The tray and its contents were put in a laboratory tube furnace. The tube was flushed with argon. The temperature of the furnace was raised to 950° C. and the system maintained at this temperature for 2 hours under an argon atmosphere to deoxidize the powder. The furnace was allowed to cool overnight while maintaining a slight argon flow through the tube. The resulting powder's properties are summarized in Table II.

TABLE II

| Property | Value |
|---|---|
| Fisher Avg. Part. Diam., FAPD ($\mu$) | 1.4 |
| Scott Bulk Dens., SBD (g/in$^3$) | 16.2 |
| Surface Area (cm$^2$/g) | 23,000 |
| Carbon (ppm) | 154 |
| Chromium (ppm) | 34 |
| Iron (ppm) | 47 |
| Nickel (ppm) | 74 |
| Nitrogen (ppm) | 2880 |
| Oxygen (ppm) | 9900 |
| Silicon (ppm) | 30 |
| Sulfur (ppm) | 13 |

The niobium nitride (NbN) powder was produced according to the same process as the niobium powder described above with the following additional steps. After the furnace cooled overnight, the powder was further processed by increasing the furnace temperature to 680° C. as measured with a thermocouple inside the tube suspended over the sample and the pressure was reduced to 610 mm Hg. Using nitrogen, the pressure was increased to 760 mm Hg. Over the next thirty minutes, the temperature was increased to approximately 750° C. and the pressure was maintained between 660 and 760 mm Hg by adding nitrogen gas to replace the nitrogen consumed in the reaction. At this point, the pressure was reduced to 460 mm Hg and then increased to 760 mm Hg using nitrogen. A significant increase in the reaction rate occurred as indicated by the rate of pressure drop and an increase in the temperature. One hour after the start of the process, the temperature had reached 900° C. and the reaction was proceeding at a moderate rate as indicated by the rate of pressure decrease. The pressure was reduced to 250 mm Hg and then the system was returned to 760 mm Hg with nitrogen. A rapid pressure drop followed and a temperature increase occurred. The pressure was maintained at 760 mm Hg using nitrogen additions for the next 15 minutes as the temperature increased to 960° C. Following complete evacuation of the tube, nitrogen was added to bring the pressure to 760 mm Hg. Very little pressure drop followed indicating the reaction was essentially complete. Finally, the pressure was increased to 810 mm Hg and the system was maintained at 1000° for six hours.

After cooling to room temperature, the powder was passivated by controlled exposure to air. The powder was then leached with dilute sulfuric acid to remove MgO, $Mg_2N_3$ and residual Mg, and then with high purity water to remove traces of acid. The oxygen and nitrogen content of the powder were measured using a LECO 436 oxygen/nitrogen analyzer. The nitrogen concentration was 151,000 ppm corresponding to the compound NbN without excess nitrogen. The oxygen content was 4300 ppm.

The tantalum and tantalum nitride powders were then blended together by a mechanical means. The Ta/TaN powders were mixed in proportions of 0, 25, 50, 75, and 100% TaN by weight (W/W %). The niobium and niobium nitride powders were also blended together by a mechanical means in proportions of 0, 25, 50, 75, and 100% NbN by weight (W/W %). These powders were then used as capacitor substrates by pressing the mixtures into pellets and processing the pellets using procedures similar to those in place for making solid Ta or Nb capacitors. Similar considerations apply to other refractory metals (Ti, Zr, Hf) and refractory metal nitride mixtures and their use as capacitor substrates.

EXAMPLES

The invention is now further disclosed with reference to the following non-limiting Examples.

Example 1

Various Ta/TaN Mixture Combinations at a Given Sintering Temperature

From the Ta/TaN mixtures, sintered pellets were made according to the pellet preparation and formation conditions summarized in Table III.

TABLE III

| | |
|---|---|
| Pellet Mass | 0.14 gm |
| Press Density | 5.5 g/cm$^3$ |
| Sintering Temperature | 1600° C., 1700° C. |
| Sintering Time | 20 minutes |
| Formation Voltage (V$_f$) | 40 V |
| Formation Temperature | 80° C. |
| Current Density | 100 mA/gm |
| Hold Time | 2 hours |
| DCL Test Voltage | 28 V (70% V$_f$) |
| Soak Time | 2 hours |

The pellets were annealed at 400° C. for 30 minutes in air. The sintered pellet pore size distributions were measured with a Micromeritics Auto Pore III Porosimeter using pellets pressed at 5.5 g/cm$^3$. Solid capacitors were then made using conditions and procedures in place for processing tantalum substrate capacitors to the same voltage rating.

Figure 2:
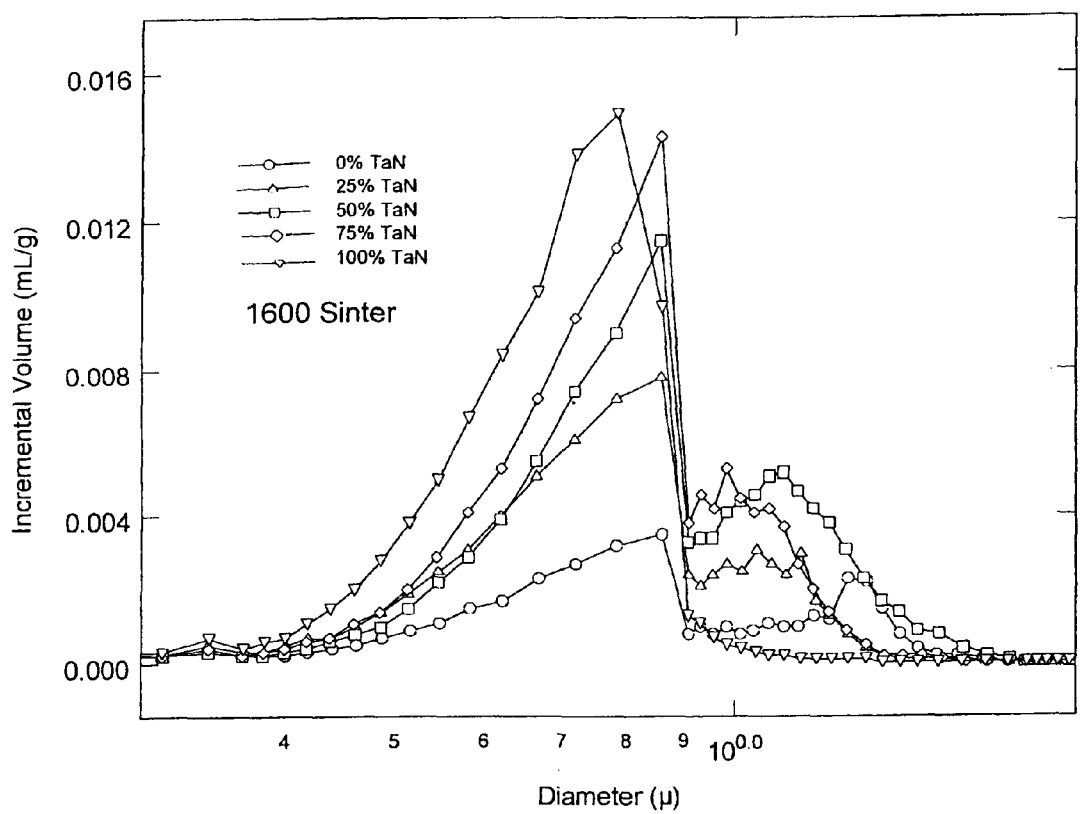
FIG. 2 is a graph of the sintered pellet pore size distribution for pellets vs. the incremental volume for pellets sintered at a temperature of 1600° C.
Figure 3:
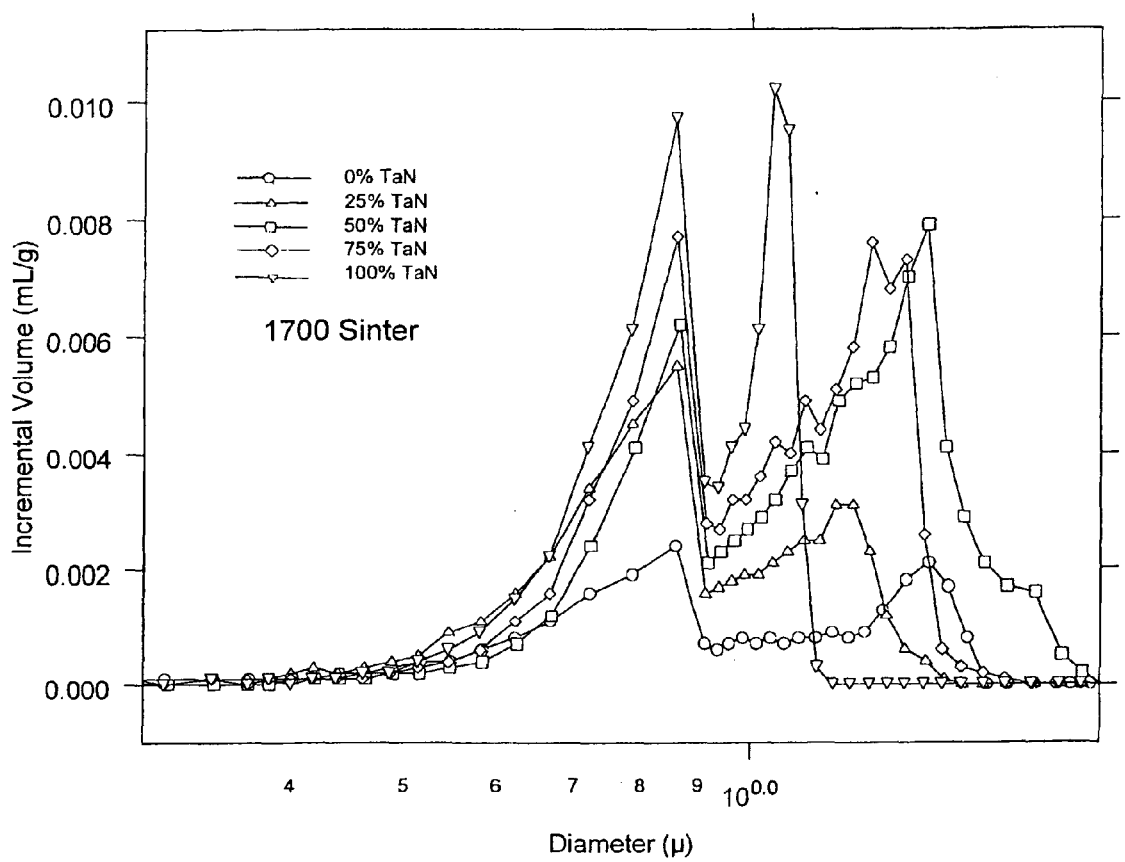
FIG. 3 is a graph of the sintered pellet pore size distribution for pellets vs. the incremental volume for pellets sintered at a temperature of 1700° C.
Figure 4:
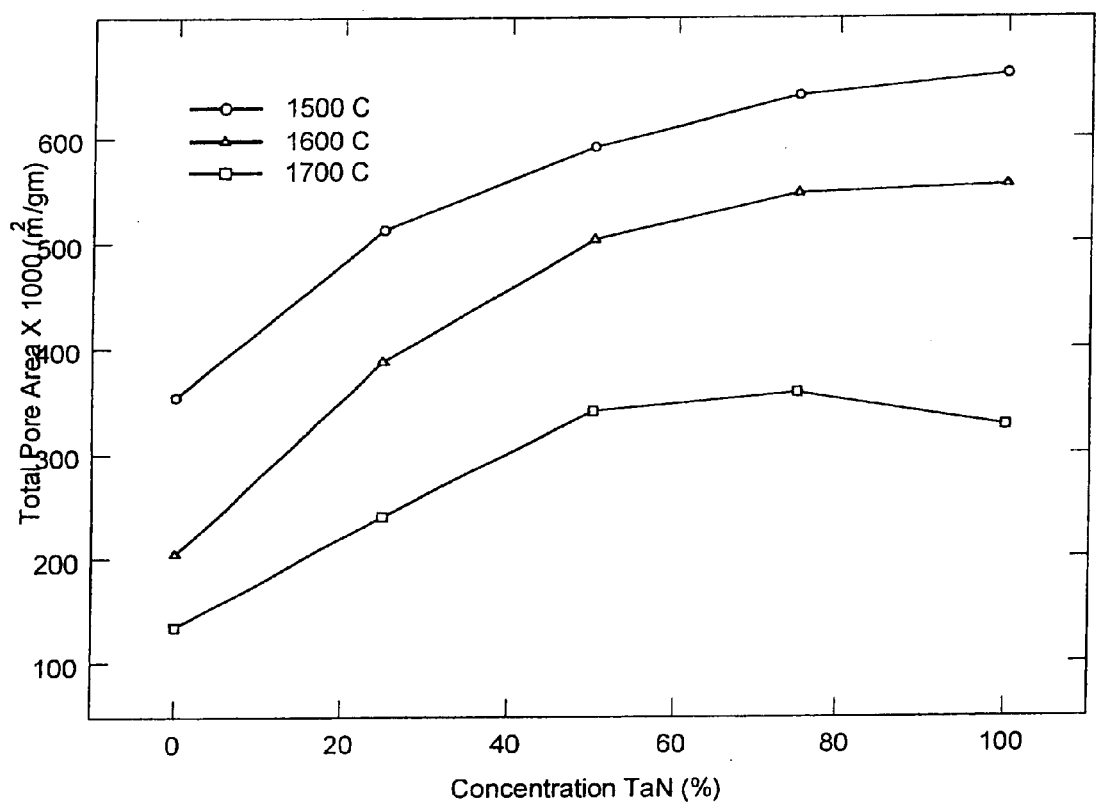
FIG. 4 is a graph of the TaN concentration vs. the total pellet pore area for various sintering temperatures.
Figure 5:
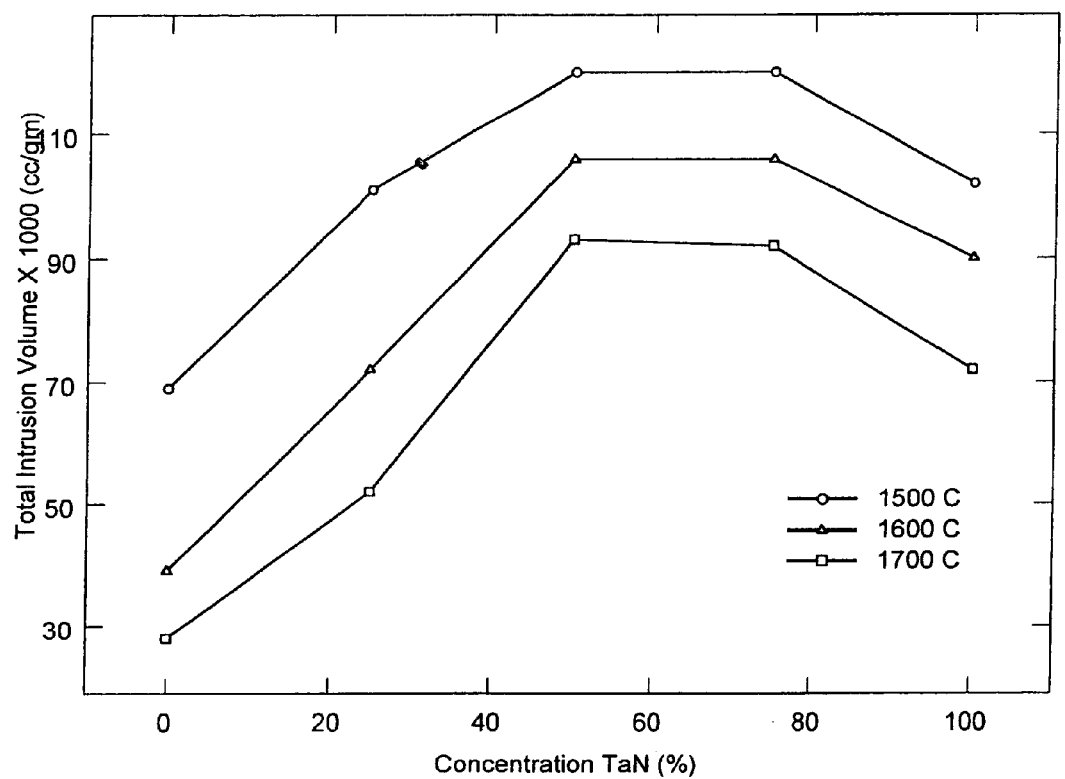
FIG. 5 is a graph of the TaN concentration vs. the total intrusion volume for various sintering temperatures.
Figure 6:
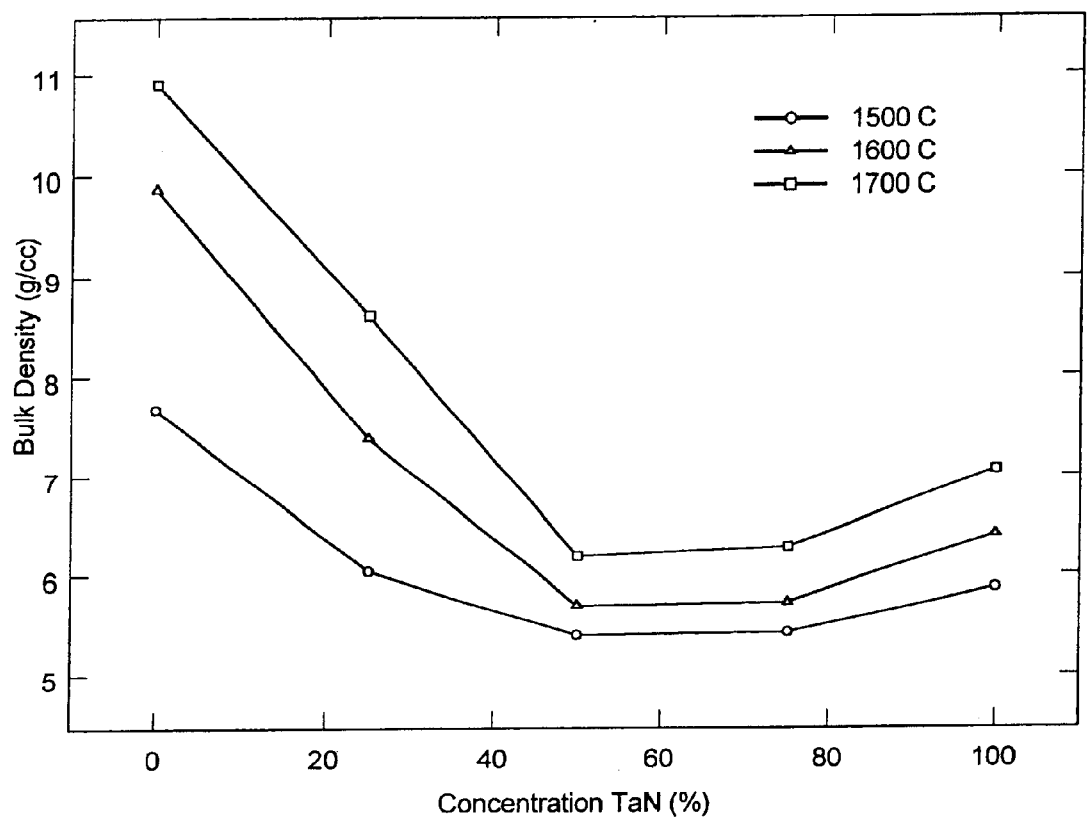
FIG. 6 is a graph of the TaN concentration vs. the pellet bulk density for various sintering temperatures.
Figure 7:
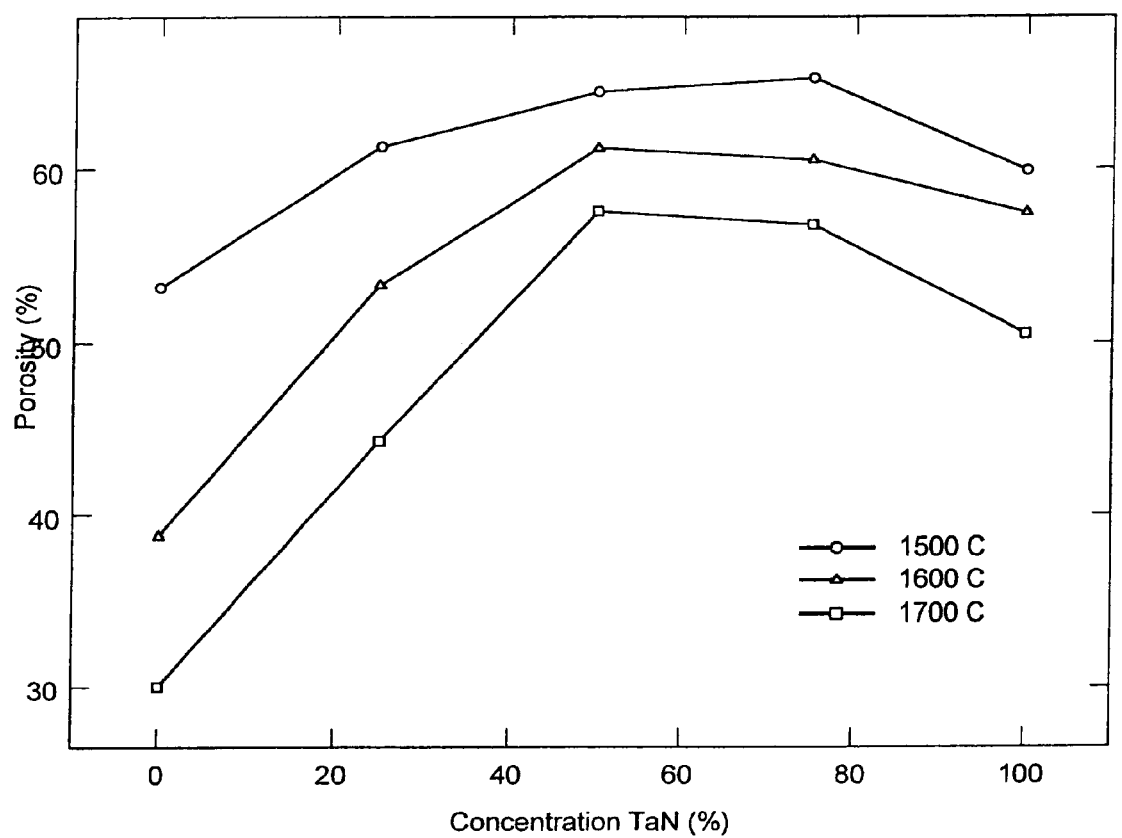
FIG. 7 is a graph of the TaN concentration vs. the pellet porosity for various sintering temperatures.

FIGS. 1–3 show the sintered pellet pore size distributions for the various Ta/TaN mixture combinations at a given sintering temperature. Notice that the 50/50 mixture has the greatest fraction of intra-agglomerate pores at all sintering temperatures and that all of the mixtures have a more open pore structure than the pure substrate pellets. Based on the intrusion data, it is possible to calculate the total pellet pore area, the total intrusion volume, the pellet bulk density and the pellet porosity. FIGS. 4–7 show the results plotted as a function of TaN concentration and sintering temperature. Notice that the maximum pellet porosity occurs in the 50–75% TaN range. Also at any given sintering temperature, the total pellet pore surface area is relatively independent of the TaN concentration above 50%TaN and the total intrusion volume maximizes in the 50–75% TaN range.

Figure 8:
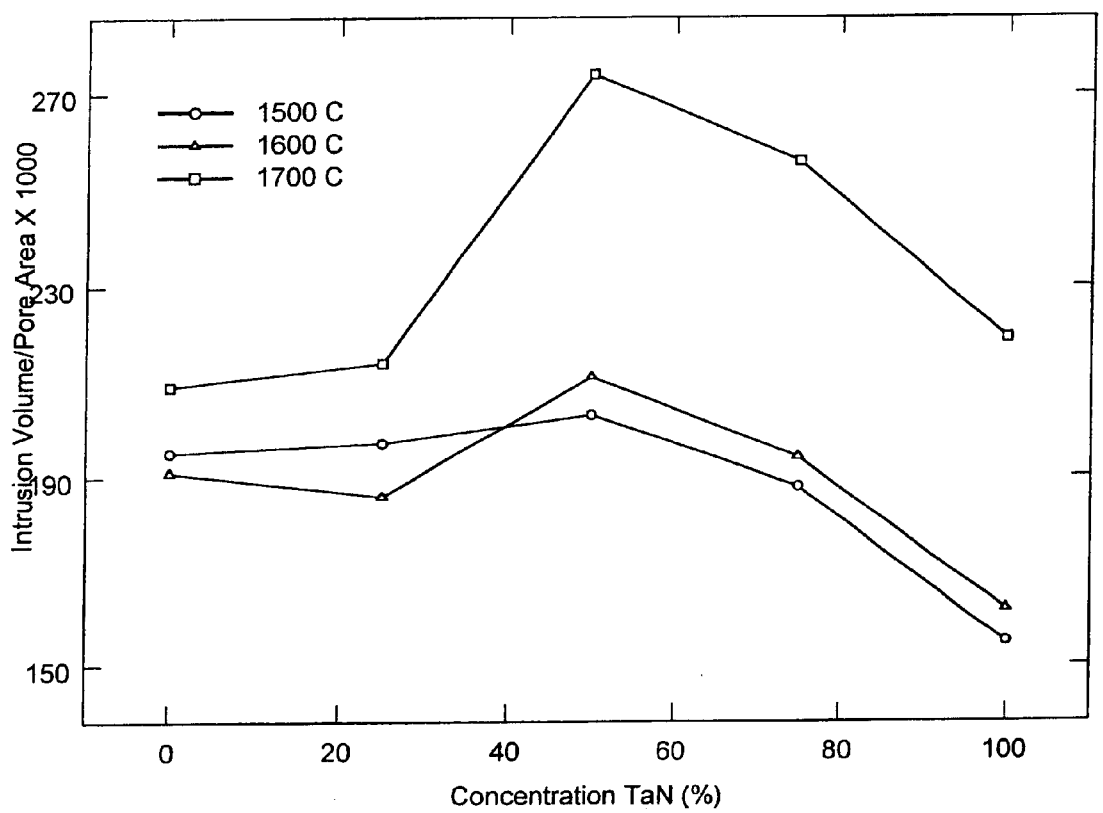
FIG. 8 is a graph of the TaN concentration vs. the ratio of the total intrusion volume to the total pore area for various sintering temperatures.

FIG. 8 shows the ratio of the total intrusion volume to the total pore area. At a fixed total pore area, the maximum intrusion volume occurs at about 50% TaN. This is further evidence that sintered pellets made from the 50/50 Ta/TaN mixture have the most open pore structure.

These trends probably occur because of the difference in the sintering behavior of the substrate materials. The tantalum agglomerates sinter faster than the tantalum nitride and shrink to leave a matrix of tantalum nitride. Capacitor manufactures believe that a large fraction of intra-agglomerate pores are necessary for making capacitors from high CV powders. Also, an open porosity will help to reduce the capacitor ESR.

Table IV summarizes the wet test electrical properties of the powders. Even 25% TaN in the blend will increase the capacitance significantly relative to pure tantalum. This is especially significant in light of the fact that the dielectric constant of the anodic film in a TaN substrate is about one half that of the anodic oxide film on tantalum. The leakages were low up to 75% TaN at the 1600° C. sinter condition but elevated above 25% TaN at 1700° C. sinter.

TABLE IV

| Powder | Capacitance ($\mu F \cdot V/gm$) Sintering Temperature | | Leakage ($nA/\mu F \cdot V$) Sintering Temperature | |
|---|---|---|---|---|
| (% TaN) | 1600° | 1700° | 1600° | 1700° |
| 0 | 14,500 | — | 0.05 | — |
| 25 | 22,400 | 11,900 | 0.25 | 0.15 |
| 50 | 23,300 | 11,900 | 0.36 | 0.82 |
| 75 | 26,800 | 12,700 | 0.25 | 0.72 |
| 100 | 26,600 | 17,600 | 1.72 | 1.23 |

The solid capacitor results are given in Table V. Interpretation of the results is confounded because the different substrate capacitors do not have the same surface area. This problem will be investigated further in Example 2 below. Even a comparison of capacitors with the same capacitance is misleading because of the difference in the dielectric constant of anodic oxide film on tantalum and the anodic film on tantalum nitride. In any case, it was possible to make good 6V solid capacitors with the 50/50 Ta/TaN mixture. Some indication of the more open pore structure in this system can be seen in the very high wet to solid capacitance recovery. The apparent lower ESR of the Ta/TaN system is probably not significant.

TABLE V

| Powder ID | Wet DCL (nA/μF · V) | Wet Cap (μF · V/g) | Solid DCL (nA/μF · V) | Solid Cap (μF · V/g) | Cap Rec | ESR (ohms) |
|---|---|---|---|---|---|---|
| TaN @ 1600° | 0.214 | 26,609 | 0.453 | 26,590 | 99.93% | 0.22 |
| 50% TaN @ 1600° | 0.131 | 23,679 | 0.216 | 24,441 | 103.22% | 0.20 |
| NA30K @ 1600° | 0.095 | 15,926 | 0.191 | 16,202 | 101.73% | 0.42 |
| NA30K @ 1500° | 0.237 | 27,424 | 0.588 | 27,608 | 100.67% | 0.24 |

| | Life Test Dcl (nA/μF · V) | | | | | |
|---|---|---|---|---|---|---|
| | 0 hours @ 1.53 × Vr | | 168 hours @ 1.53 × Vr | | Yield (<2.5 | # Shorts |
| Powder ID | 25° C. | 85° C. | 85° C. | 25° C. | nA/μF · V) | (ohms) |
| TaN @ 1600° | 0.453 | 2.142 | 1.887 | 0.388 | 100.0% | 0 |
| 50% TaN @ 1600° | 0.216 | 1.237 | 1.118 | 0.195 | 100.0% | 0 |
| NA30K @ 1600° | 0.191 | 0.683 | 0.587 | 0.186 | 100.0% | 0 |
| NA30K @ 1500° | 0.588 | 2.668 | 2.329 | 0.477 | 100.0% | 0 |

Table VI summarizes the bias dependence (in percent) of the capacitors after heat treatment. Like TaN substrate capacitors, the capacitance of the units made from Ta/TaN blends is insensitive to bias indicating that they did not degrade due to oxygen depletion of the anodic film during heat treatment.

TABLE VI

| Powder | Sintering Temperature | |
|---|---|---|
| (% TaN) | 1600° C. | 1700° C. |
| 0 | −4.12 | — |
| 25 | −2.02 | −2.03 |
| 50 | 0.66 | 0.99 |
| 75 | 0.25 | 0.28 |
| 100 | 0.20 | 0.19 |

Sintered pellets made from blends of tantalum and tantalum nitride powders have a higher fraction of intra-agglomerate pores than those made from tantalum or tantalum nitride alone. A substrate consisting of a 50/50 or a 25/75 mixture of Ta/TaN should produce solid capacitors with higher capacitance recovery and lower ESR.

Example 2

Various Ta/TaN Mixture Combinations at a Given Pore Area or Capacitance

Additional testing was conducted to compare the different composition sintered pellets at the same surface area. From the Ta/TaN mixtures, sintered pellets were made according to the pellet preparation, formation and testing conditions summarized in Table VII. The press density was 5.5 g/cm$^3$ and the sintering time was 20 minutes. Capacitances were measured on 0.14 gm pellets sintered at appropriate temperatures to give equivalent pore area or capacitances.

TABLE VII

| | |
|---|---|
| Pellet Mass | 0.14 gm |
| Press Density | 5.5 g/cm$^3$ |
| Sintering Temperature | Various |
| Sintering Time | 20 minutes |
| Formation Voltage (V$_f$) | 16 V |

TABLE VII-continued

| | |
|---|---|
| Formation Temperature | 80° C. |
| Current Density | 100 mA/gram |
| Hold Time | 2 hours |
| DCL Test Voltage | 11 V (70% V$_f$) |
| Soak Time | 5 minutes |

As mentioned in Example 1, when pellets of different composition were sintered at the same temperature they had different capacitances. This is strong evidence that the total pellet surface area is different for each pellet composition. A more meaningful comparison for capacitor applications is between pellets with the same surface area. In this Example, two measures of surface area were used. One was the pore area as calculated from the porosimetry data and the other was the capacitance, which gives a measure of the "usable" surface area.

Figure 9:
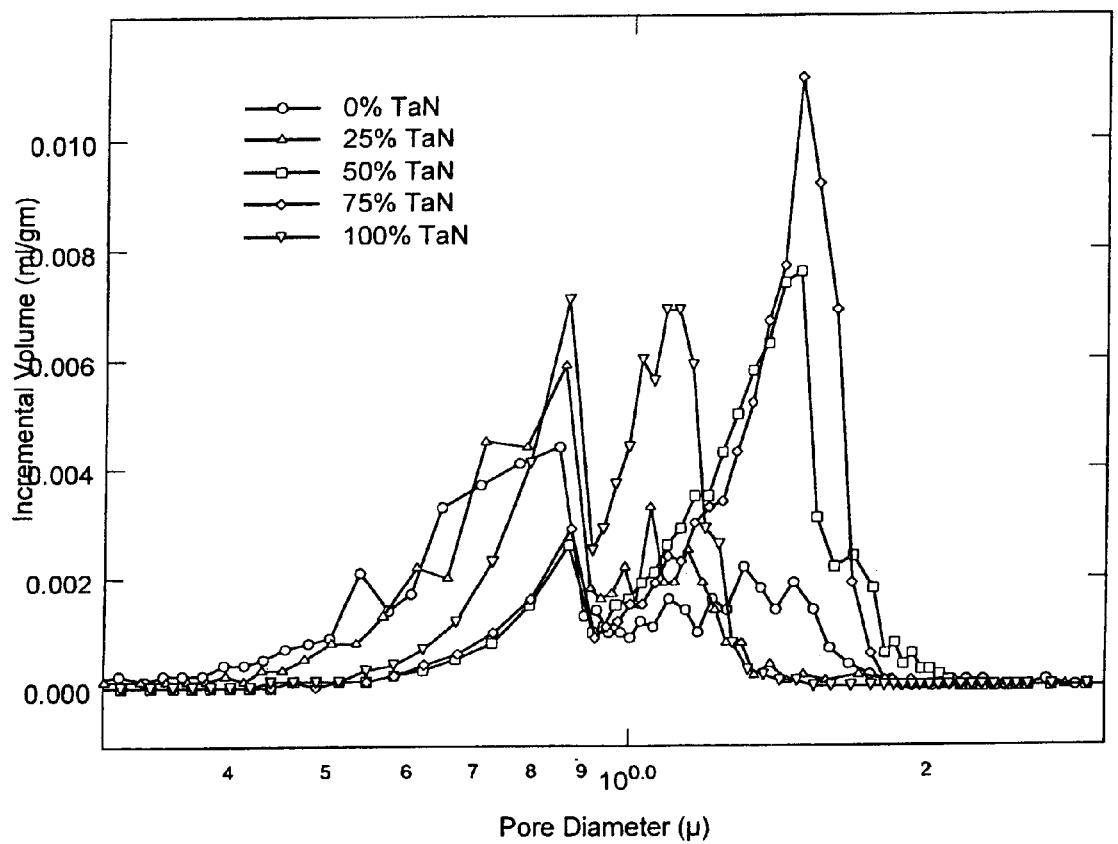
FIG. 9 is a graph of the sintered pellet pore size distribution vs. the incremental volume for pellets with the same pore area.
Figure 10C:
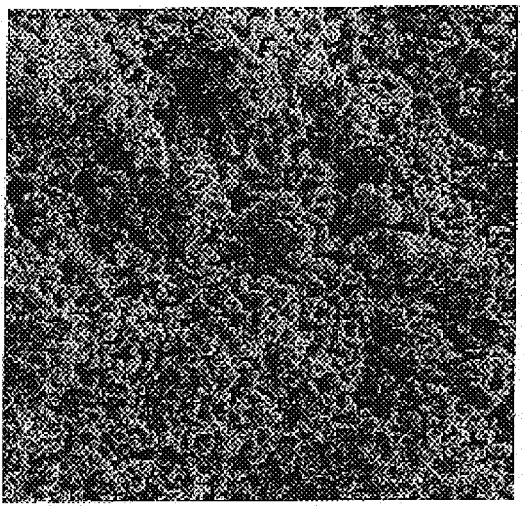
FIG. 10c is a scanning electron photomicrograph showing the pore structure for a 50/50% Ta/TaN pellet composition sintered at a temperature of 1650° C.
Figure 10D:
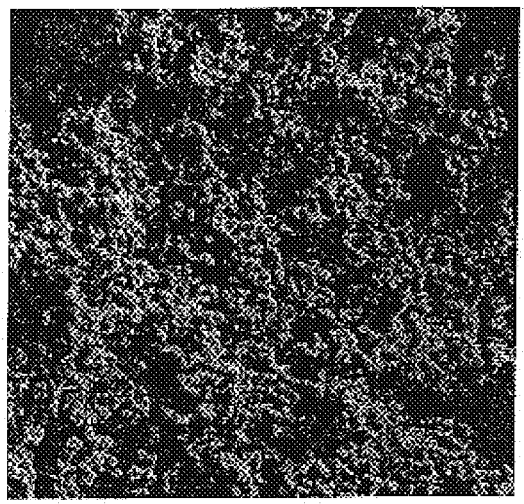
FIG. 10d is a scanning electron photomicrograph showing the pore structure for a 25/75% Ta/TaN pellet composition sintered at a temperature of 1700° C.
Figure 10E:
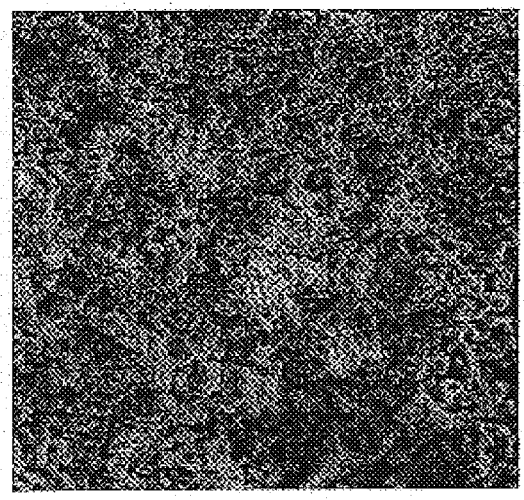
FIG. 10e is a scanning electron photomicrograph showing the pore structure for a 100% TaN pellet composition sintered at a temperature of 1650° C.

Table VIII summarizes the sintering temperatures for pellets with pore areas in the range 240–280 cm$^2$/gm. The pore size distributions are plotted in FIG. 9. The pellets containing 50 and 75 W/W % TaN have more open pore size distribution, as measured by the higher fraction of large pores.

TABLE VIII

| % TaN | Sintering Temperature (° C.) | Pore Area (cm$^2$/gm) | Capacitance (μF · V/gm) |
|---|---|---|---|
| 0 | 1550 | 256 | 17800 |
| 25 | 1650 | 236 | 19500 |
| 50 | 1650 | 252 | 15100 |
| 75 | 1700 | 268 | 13300 |
| 100 | 1650 | 284 | 16800 |

Another indication of this more open structure of the 50 and 75 W/W % TaN pellets can be seen in the Scanning Electron Microscope (SEM) photographs reproduced in FIGS. 10a–10e. The different composition pellets did not have the same capacitance, however, as seen in Table VIII. Notice that although the 50 and 75 W/W % TaN pellets have a more open pore structure they have significantly lower surface areas, as measured by the capacitance, than the pellets with lower and high TaN contents.

Figure 11:
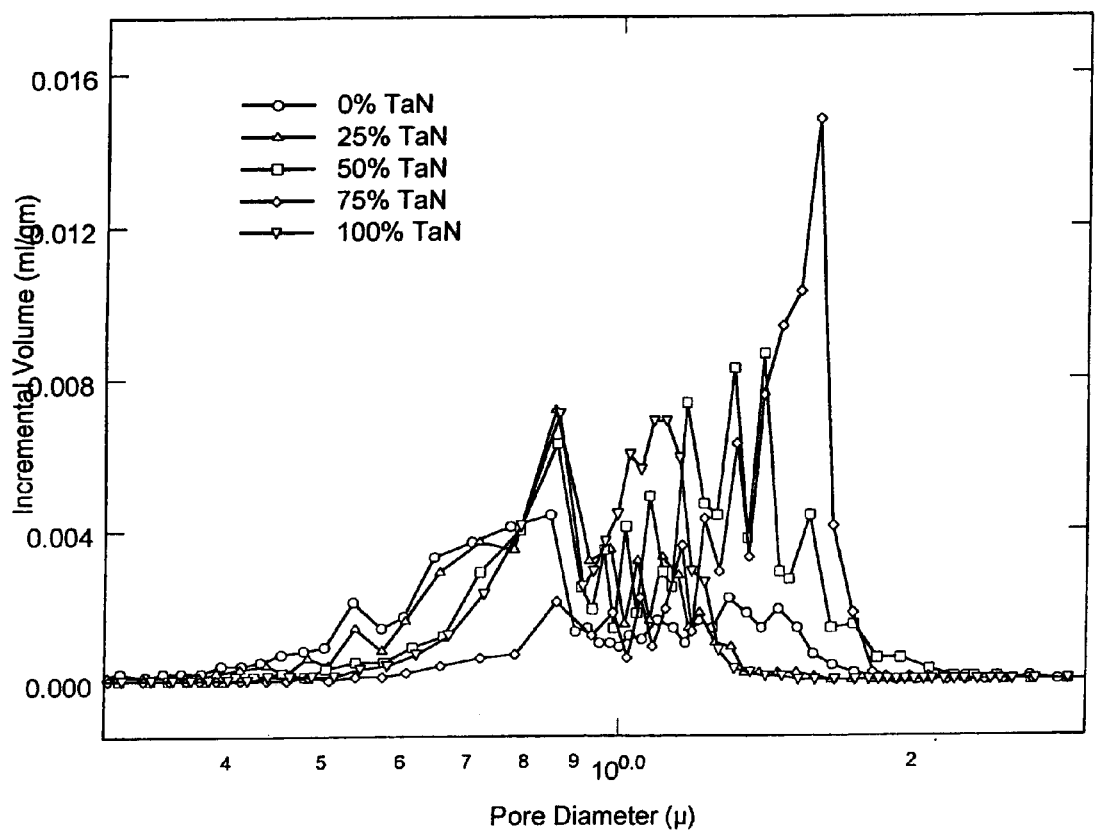
FIG. 11 is a graph of the sintered pellet pore size distribution vs. the incremental volume for pellets with the same capacitance.
Figure 12A:
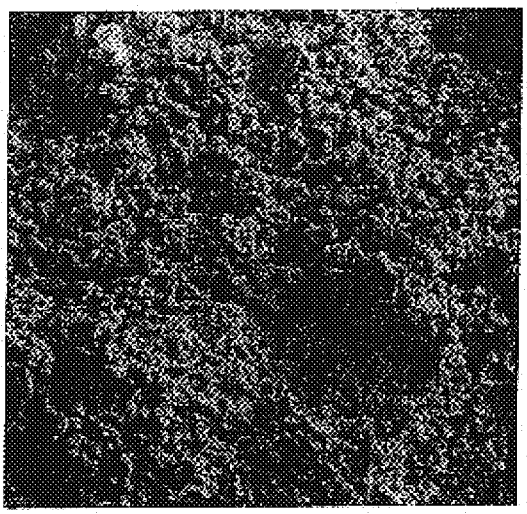
FIG. 12a is a scanning electron photomicrograph showing the pore structure for a 100% Ta pellet composition sintered at a temperature of 1550° C.
Figure 12B:
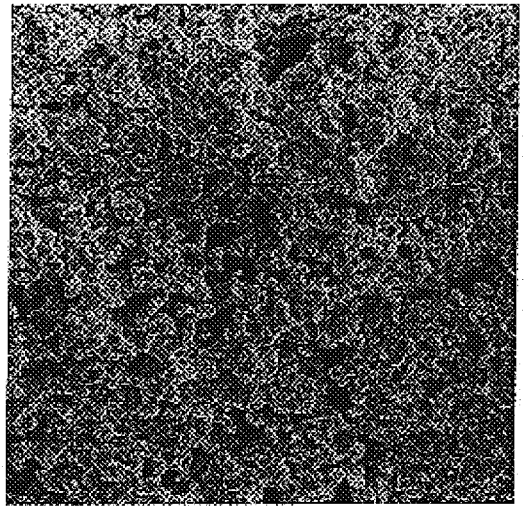
FIG. 12b is a scanning electron photomicrograph showing the pore structure for a 75/25% Ta/TaN pellet composition sintered at a temperature of 1660° C.
Figure 12C:
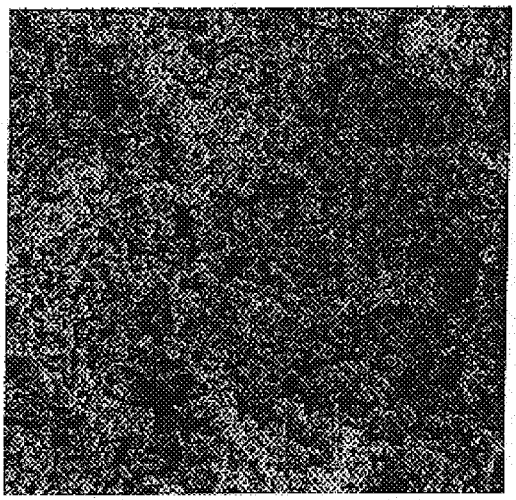
FIG. 12c is a scanning electron photomicrograph showing the pore structure for a 50/50% Ta/TaN pellet composition sintered at a temperature of 1645° C.
Figure 12D:
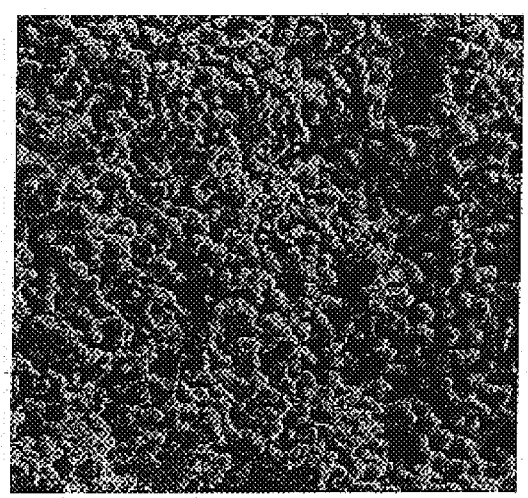
FIG. 12d is a scanning electron photomicrograph showing the pore structure for a 25/75% Ta/TaN pellet composition sintered at a temperature of 1675° C.
Figure 12E:
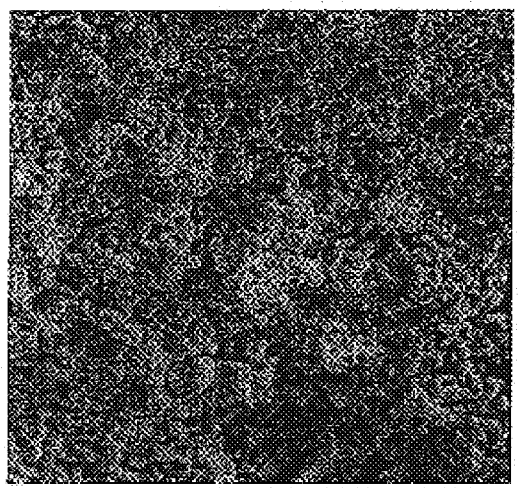
FIG. 12e is a scanning electron photomicrograph showing the pore structure for a 100% TaN pellet composition sintered at a temperature of 1650° C.

The results for pellets sintered to the same capacitance are summarized in Table IX. The pore size distribution are plotted in FIG. 11 and typical SEM results are shown in FIGS. 12a–12e.

TABLE IX

| % TaN | Sintering Temperature (° C.) | Capacitance ($\mu$F · V/gm) |
|---|---|---|
| 0 | 1550 | 17800 |
| 25 | 1660 | 16600 |
| 50 | 1645 | 17400 |
| 75 | 1675 | 17900 |
| 100 | 1650 | 16800 |

Again, we see that the pellets made from the 50/50 and 25/75 W/W % Ta/TaN pellets have more open pore structures. In this case, the 25/75% Ta/TaN composition is clearly superior in terms of open porosity.

Example 3

Various Nb/NbN Mixture Combinations

Figure 13:
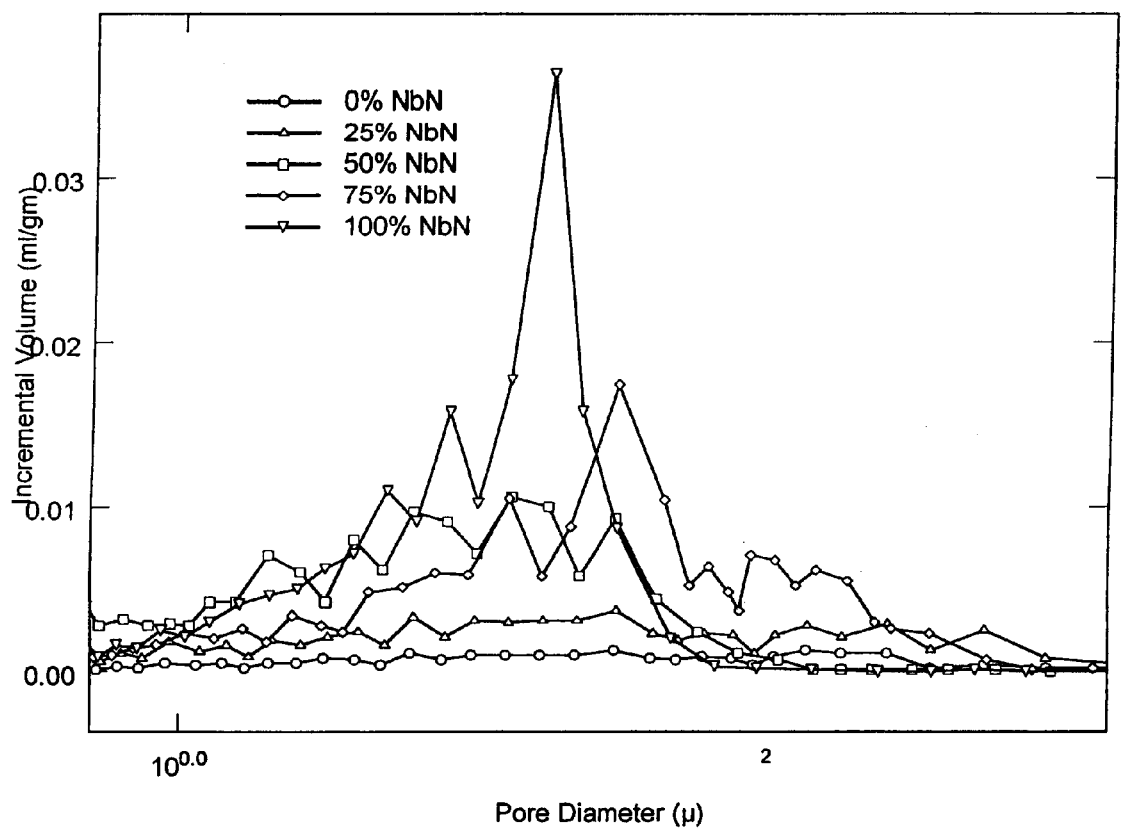
FIG. 13 is a graph of the sintered pellet pore size distribution vs. the incremental volume for pellets sintered at a temperature of 1600° C. for the Nb/NbN system.

The niobium and niobium nitride powders mixtures were pressed into pellets and sintered. The pellets were pressed to 3.0 g/cm$^3$ and sintered at 1600° C. FIG. 13 shows the sintered pellet pore size distributions for pellets made from the various Nb/NbN mixture combinations. While the difference is not as dramatic as with the Ta/TaN system, the Nb/NbN pellets containing 25/75% W/W % Nb/NbN had a somewhat more open pore structure than the pure NbN, and considerably better porosity than the pure Nb. Based on these results it is reasonable to conclude that in general the same advantages that apply to the Ta/TaN system also hold for the Nb/NbN system.

It is to be understood that the above-described embodiments are simply illustrative of the principles of the invention. Various and other modifications, changes, details and uses may be made by those skilled in the art which will embody the principles of the invention and fall within the spirit and scope thereof.

What is claimed is:

1. A process for making high grade electrolytic capacitors from a refractory metal material comprising:

mixing the refractory metal material with a refractory metal nitride material to form a mixture at a refractory metal nitride concentration of at least 25 percent, by weight, forming pellets from said mixture at a temperature capable of sintering the mixture, subjecting said sintered pellets to anodization, and forming capacitors from said anodized pellets.

2. The process of claim 1 wherein the refractory metal is selected from the group consisting of Ta and Nb.

3. A powder suitable for use as a substrate material for electrolytic capacitors comprising a refractory metal and a refractory metal nitride mixture wherein the powder is sintered at an appropriate temperature and results in a pellet with an open pore structure, wherein the powder has a refractory metal nitride concentration of at least 25 percent, by weight.

4. The powder of claim 3 wherein the refractory metal is selected from the group consisting of Ta and Nb.

5. An electrolytic capacitor anode comprising the powder of claim 4.

6. A wet electrolytic capacitor comprising the anode of claim 5.

7. A solid electrolytic capacitor comprising the anode of claim 5.

8. A process for making high grade electrolytic capacitors from a refractory metal material comprising:

mixing the refractory metal with a refractory metal nitride material to form a mixture, forming pellets from said mixture at a temperature capable of sintering the mixture, subjecting said sintered pellets to anodization, and forming capacitors from said anodized pellets, wherein the refractory metal concentration ranges from about 5 percent to about 70 percent based on weight of the mixture.

9. A process for making high grade electrolytic capacitors from a refractory metal material comprising:

mixing the refractory metal with a refractory metal nitride material to form a mixture, forming pellets from said mixture at a temperature capable of sintering the mixture, subjecting said sintered pellets to anodization, and forming capacitors from said anodized pellets, wherein the refractory metal is selected from the group consisting of Ta and Nb, and the refractory metal concentration ranges from about 5 percent to about 70 percent based on weight of the mixture.

10. A process for making high grade electrolytic capacitors from a refractory metal material comprising:

mixing the refractory metal with a refractory metal nitride material to form a mixture including a concentration of at least 25 percent of refractory metal based on weight of the mixture, forming pellets from said mixture at a temperature capable of sintering the mixture, subjecting said sintered pellets to anodization, and forming capacitors from said anodized pellets, wherein the refractory metal is selected from the group consisting of Ta and Nb, and the refractory metal concentration ranges from about 25 percent to about 50 percent based on weight of the mixture.

* * * * *